US010262680B2

(12) United States Patent
Mysore et al.

(10) Patent No.: US 10,262,680 B2
(45) Date of Patent: *Apr. 16, 2019

(54) VARIABLE SOUND DECOMPOSITION MASKS

(71) Applicant: Adobe Inc., San Jose, CA (US)

(72) Inventors: Gautham J. Mysore, San Francisco, CA (US); Paris Smaragdis, Urbana, IL (US)

(73) Assignee: Adobe Inc., San Jose, CA (US)

( * ) Notice: Subject to any disclaimer, the term of this patent is extended or adjusted under 35 U.S.C. 154(b) by 718 days.

This patent is subject to a terminal disclaimer.

(21) Appl. No.: 13/931,450

(22) Filed: Jun. 28, 2013

(65) Prior Publication Data

US 2015/0006168 A1 Jan. 1, 2015

(51) Int. Cl.
| | |
|---|---|
| *G10L 21/0364* | (2013.01) |
| *G10L 15/20* | (2006.01) |
| *G10L 21/0208* | (2013.01) |
| *G10L 25/84* | (2013.01) |
| *G10L 25/51* | (2013.01) |

(52) U.S. Cl.
CPC .............. *G10L 25/84* (2013.01); *G10L 15/20* (2013.01); *G10L 21/0208* (2013.01); *G10L 21/0364* (2013.01); *G10L 25/51* (2013.01)

(58) Field of Classification Search
CPC ..... G10L 15/20; G10L 21/0208; G10L 25/48; G10L 21/0364
USPC ........................................................ 704/226
See application file for complete search history.

(56) References Cited

U.S. PATENT DOCUMENTS

| | | | | |
|---|---|---|---|---|
| 2003/0002687 A1* | 1/2003 | Raptopoulos | ........ | G10K 11/175 381/71.1 |
| 2005/0240401 A1* | 10/2005 | Ebenezer | ............ | G10L 21/0208 704/226 |
| 2010/0004926 A1* | 1/2010 | Neoran | ................... | G10L 25/48 704/201 |
| 2011/0058685 A1* | 3/2011 | Sagayama | ........... | G10L 21/0272 381/98 |
| 2011/0058686 A1* | 3/2011 | Toraichi | ................... | B60D 1/58 381/98 |
| 2012/0166188 A1* | 6/2012 | Chakra | ................... | G10L 15/26 704/226 |
| 2012/0316886 A1* | 12/2012 | Pishehvar | ............. | G10L 19/032 704/500 |
| 2014/0023218 A1* | 1/2014 | Woods | ................ | G10L 21/0364 381/317 |

OTHER PUBLICATIONS

Benaroya, et al.,' "Non negative sparse representation for Wiener based source separation with a single sensor", in proceedings of the ICASSP 2003., 2003, 4 pages.

(Continued)

*Primary Examiner* — Farzad Kazeminezhad
(74) *Attorney, Agent, or Firm* — Wolfe-SBMC

(57) ABSTRACT

Variable sound decomposition masking techniques are described. In one or more implementations, a mask is generated that incorporates a user input as part of the mask, the user input is usable at least in part to define a threshold that is variable based on the user input and configured for use in performing a sound decomposition process. The sound decomposition process is performed using the mask to assign portions of sound data to respective ones of a plurality of sources of the sound data.

20 Claims, 10 Drawing Sheets

(56) References Cited

OTHER PUBLICATIONS

Brand, "Structure learning in conditional probability models via an entropic prior and parameter extinction", Neural Computation, 1999, 27 pages.
Casey, "Separation of Mixed Audio Sources by Independent Subspace Analysis", Proceedings of the International Computer Music Conference, Copyright Mitsubishi Electric Information Technology Center America, Sep. 2001, 10 pages.
Hofmann, "Probabilistic Latent Semantic Indexing", ACM SIGIR Special Interest Group on Information Retrieval Conference (SIGIR), 1999, 8 pages.
Lee, et al.,' "Algorithms for Non-negative Matrix Factorization", in NIPS 13, 2001, 2001, 7 pages.
Roweis, "One Microphone Source Separation", Advances in Neural Information Processing Systems, 2001, 7 pages.
Vincent, et al.,' "Music Transcription with ISA and HMM", in proceedings of ICA 2004., 2004, 8 pages.

\* cited by examiner

VARIABLE SOUND DECOMPOSITION MASKS

BACKGROUND

Sound decomposition may be leveraged to support a wide range of functionality. For example, sound data, such as that of a movie or of a recording of a song, is often captured in a noisy environment and may include both desirable and undesirable parts. The sound data for a movie, for instance, may include dialog, which is desirable, but may also include a hissing noise, the unintended ringing of a cell phone, and so on. Thus, it may be desirable to decompose the sound data such that the dialog may be separated from the cell phone.

However, conventional techniques that are employed to perform this decomposition may not be configured to readily address some challenges in sound decomposition such as when confronted with different types of noise. For example, although conventional techniques may deal well with stationary noises (e.g., the hissing noise, a humming noise, and so on), non-stationary noises may provide additional challenges, e.g., the ringing of the cell phone, a police siren, and so on. Consequently, conventional techniques may not be able to remove sufficient amounts of this noise from sound data, which may cause portions of the sound data to remain "noisy" and less than ideal.

SUMMARY

Variable sound decomposition masking techniques are described. In one or more implementations, a mask is generated that incorporates a user input as part of the mask, the user input is usable at least in part to define a threshold that is variable based on the user input and configured for use in performing a sound decomposition process. The sound decomposition process is performed using the mask to assign portions of sound data to respective ones of a plurality of sources of the sound data.

In one or more implementations, a system includes one or more modules implemented at least partially in hardware and configured to perform operations. The operations include receiving an input via a user interface that is usable to define a threshold that is variable based on the user input and assigning portions of sound data to a respective one of a plurality of sources of the sound data as part of a sound decomposition process using a mask that is generated using the threshold.

In one or more implementations, one or more computer readable storage media comprise instructions stored thereon that, responsive to execution by a computing device, causes the computing device to perform operations. The operations include receiving a training time/frequency representation of an excerpt of sound data that corresponds to one of a plurality of sources of the sound data and receiving a sound separation time/frequency representation constructed from a sound separation model formed from the sound data using a training model, the training model constructed from the excerpt of the sound data. A user input is received that is usable to define a threshold that is variable based on the user input; and a mask is generated using the training time/frequency representation and the sound separation time/frequency representation, the mask incorporating the user and configured for use in performing a sound decomposition process.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Conventional sound decomposition techniques may perform adequately when confronted with stationary sounds, e.g., hums, hisses, and so on, that are relatively uniform. However, these conventional sound decomposition techniques may be challenged when confronted with non-stationary noises such as a police siren, traffic noise, computer keyboard sounds, a dog barking, and so on.

Sound decomposition masking techniques are described. In one or more implementations, techniques are described in which a mask may be used to improve results of a sound decomposition process. For example, an excerpt may be taken from sound data and used to generate a training model, such as an excerpt that includes noises or other sounds to be removed from the sound data. This model may be used to generate a sound separation model from the sound data that describes "what is left" of the sound data after removal of the sounds associated with the training model following a semi-supervised technique.

Time/frequency representations (e.g., spectrograms) may then be computed from these models and used to compute a mask. A user, for instance, may provide an input indicating a desired level of "aggressiveness" in generating the mask. Aggressiveness may be defined using a threshold that defines a relationship between sound data associated with different sources. The threshold may then be incorporated as part of the mask to assign different portions of the sound data (e.g., portions located at particular time/frequencies) to respective sources. For example, the threshold may be defined such that is noise is louder than speech at a particular portion of the time/frequency representation, an entirety of that portion is assigned as being associated with a noise source. Variance of the threshold may therefore be used to define an amount of aggressiveness that is to be used by the mask. Other examples of thresholds and usage are also contemplated, further discussion of which may be found in the following sections.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

Figure 1:
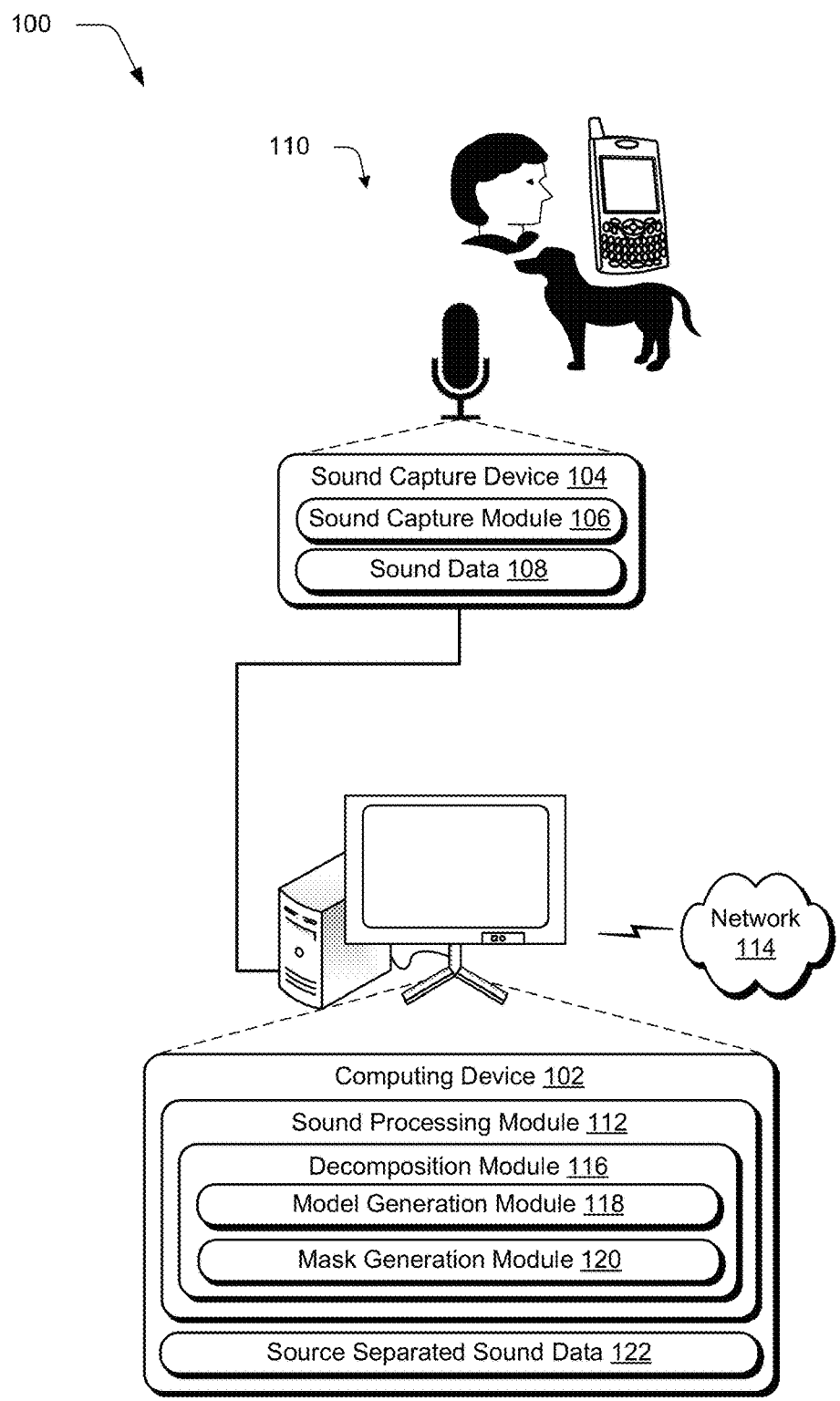
FIG. 1 is an illustration of an environment in an example implementation that is operable to employ sound decomposition and masking techniques as described herein.

FIG. 1 is an illustration of an environment 100 in an example implementation that is operable to employ sound decomposition techniques described herein. The illustrated environment 100 includes a computing device 102 and sound capture device 104, which may be configured in a variety of different ways.

The computing device 102, for instance, may be configured as a desktop computer, a laptop computer, a mobile device (e.g., assuming a handheld configuration such as a tablet or mobile phone), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as further described in relation to FIG. 10.

The sound capture device 104 may also be configured in a variety of ways. Illustrated examples of one such configuration involves a standalone device but other configurations are also contemplated, such as part of a mobile phone, video camera, tablet computer, part of a desktop microphone, array microphone, and so on. Additionally, although the sound capture device 104 is illustrated separately from the computing device 102, the sound capture device 104 may be configured as part of the computing device 102, the sound capture device 104 may be representative of a plurality of sound capture devices, and so on.

The sound capture device 104 is illustrated as including a sound capture module 106 that is representative of functionality to generate sound data 108. The sound capture device 104, for instance, may generate the sound data 108 as a recording of an audio scene 110 having one or more sound sources, which are illustrated as a user, a dog, and a cell phone in FIG. 1. This sound data 108 may then be obtained by the computing device 102 for processing.

The computing device 102 is also illustrated as including a sound processing module 112. The sound processing module 112 is representative of functionality to process the sound data 108. Although illustrated as part of the computing device 102, functionality represented by the sound processing module 112 may be further divided, such as to be performed "over the cloud" by one or more servers that are accessible via a network 114 connection, further discussion of which may be found in relation to FIG. 10.

An example of functionality of the sound processing module 112 is represented as a decomposition module 116. The decomposition module 116 is representative of functionality to decompose the sound data 108 according to a likely source of respective parts of the sound data 108. As illustrated in the audio scene 110 of FIG. 1, for instance, the decomposition module 116 may be used to separate the sound data 108 according to different sources, such as to separate dialog from the person in the audio scene 110 from the barking of a dog and ringing of a cell phone to form source separated sound data 122. This may be used to support a variety of different functionality, such as audio de-noising, music transcription, music remixing, audio-based forensics, and so on.

To perform this decomposition, the decomposition module 116 may employ a variety of different functionality. One example of this functionality is illustrated as a model generation module 118. The model generation module 118 is representative of functionality to generate models of sound data from one or more sound sources, such as users, noise, musical instruments, and so on. The models may then be used to remove portions of the sound according to the respective sources, such as to remove the sound data corresponding to the barking of the dog and ringing of the cell phone, thereby leaving sound data of the user's speech. Further discussion of functionality of the model generation module 118 may be found in relation to FIGS. 2 and 3.

Another example of the functionality of the decomposition module 116 is illustrated by a mask generation module 120. The mask generation module 120 is representative of functionality to generate variable sound decomposition masks that may be used as part of a sound decomposition process. The masks may be used as part of the sound decomposition process to assign different portions of the sound data to a respective source as above. Further, these masks may be variable in an amount of "aggressiveness" used to perform these assignments, further discussion of which may be found in relation to FIGS. 4-6.

Figure 2:
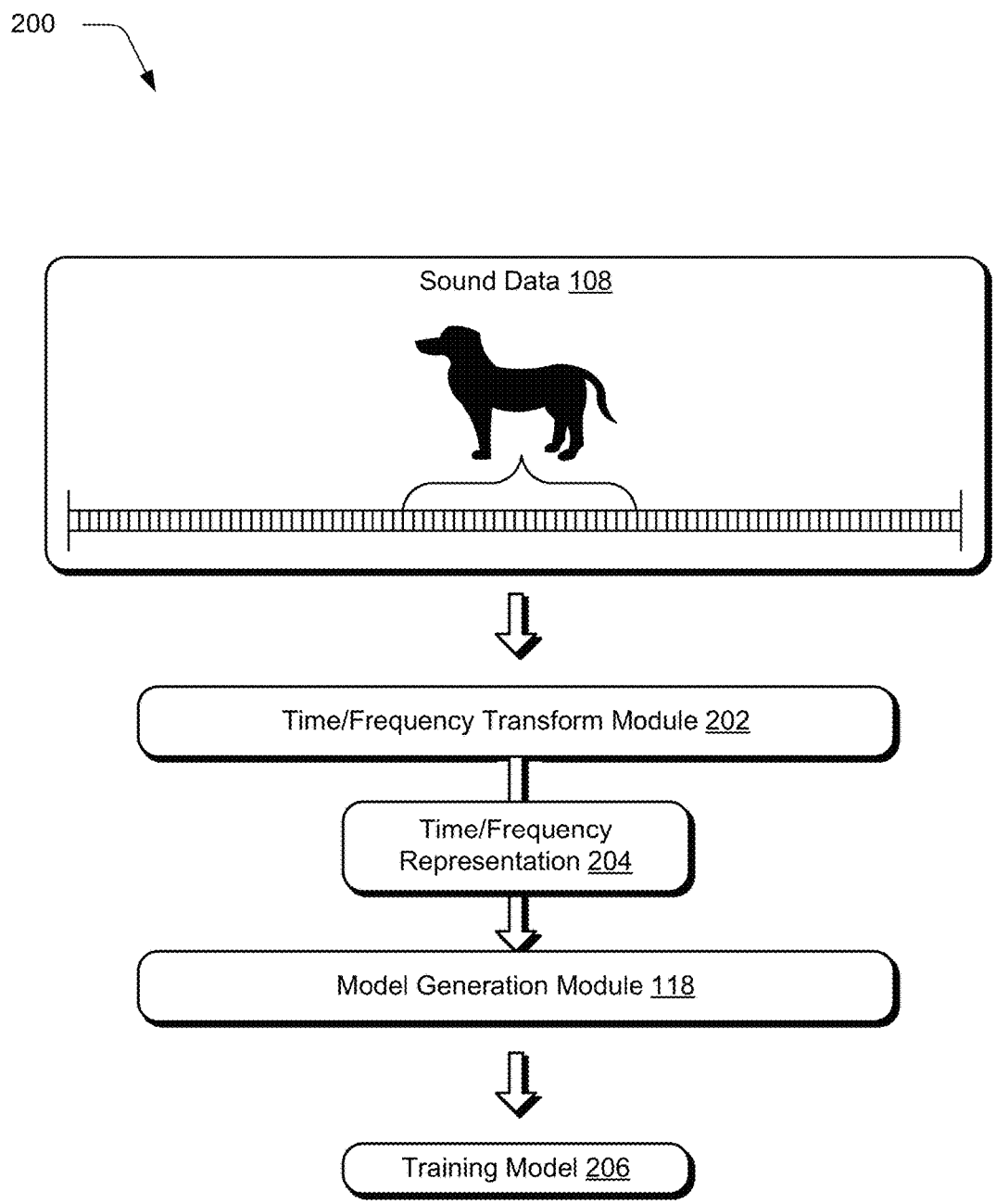
FIG. 2 depicts a system in an example implementation in which a training model is formed.

FIG. 2 depicts a system 200 in an example implementation in which a training model is formed. In this example, sound data 108 is received as previously described, and therefore may originate from a variety of sources. An excerpt is then taken from the sound data 108, the excerpt corresponding to a source that is to be removed from the sound data 108. For example, a user interface may be output via which a user may specify an excerpt of the sound data 108 that corresponds to the barking of a dog in this example as opposed to other portions of the sound data 108 that include combinations of speech and dog barking as previously described in relation to FIG. 1.

A time/frequency transform module 202 is then employed to form a time/frequency representation 204 (e.g., spectrogram) from the excerpt of the sound data 108. The time/frequency representation 204, for instance, may be used to quantify the sound data such that a plurality of different time/frequency bins are used to represent sound data at respective time/frequency combinations, e.g., time "x" and frequency "y."

This excerpt may then be processed by the model generation module 118 to form a training model 206 of the excerpt. The training model 206 may be generated in a variety of ways, such as a weighted sum of spectral components. For example, the training model 206 may be generated by the model generation module 118 through creation of a dictionary of spectral components that represent general characteristics of a sound source (e.g., the excerpt of the sound data 108 that contains the barking dog), which may be generalized to other unseen instances of the source. The model generation module 118 may also estimate weights, which represent characteristics of the specific instance of the excerpt of data. Further examples of model generation are described in relation to the Implementation Example section below. Thus, at this point the training model 206 provides a representation of sound that is to be removed from the sound data 108 that may be generalized to other "unseen" (i.e., as of yet, unprocessed) portions of the sound data 108.

Figure 3:
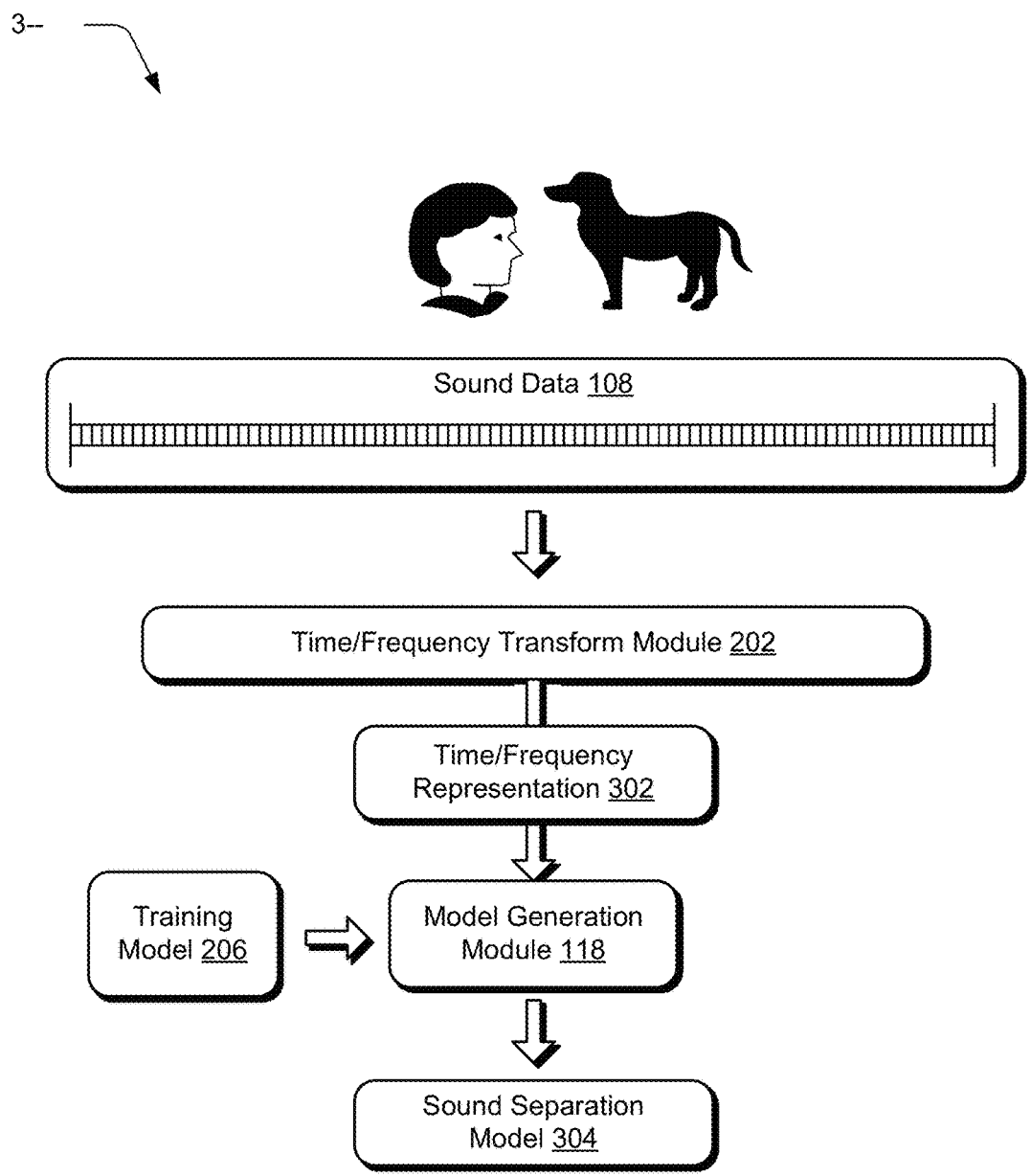
FIG. 3 depicts a system in an example implementation in which a sound separation module is formed at least in part using the training model.

FIG. 3 depicts a system 300 in an example implementation in which a sound separation module is formed at least in part using the training model. In this example, the sound data 108 is received as a whole and thus includes portions of the sound data 108 that lie "outside" of the excerpt from the previous example discussed in relation to FIG. 2. Like above, the time/frequency transform module 202 is used to form a time/frequency representation 302 from the sound data 108 that may be used to quantify the sound data such that a plurality of different time/frequency bins are used to represent sound data at respective time/frequency combinations, e.g., time "x" and frequency "y".

The model generation module 118 may then utilize this time/frequency representation 302 (e.g., a spectrogram) of the sound data 108 to generate a source separation model 304. For example, the sound separation model 304 may be generated through creation of a dictionary of spectral components like before. However, in this instance the model generation module 118 may be guided by the training model 206 in a semi-supervised fashion such that the sound separation model 304 describes spectral components that do not include the spectral components described by the training model 206.

In this way, the sound separation model 304 describes sound data that corresponds to one or more other sources of sound data that are not represented in the training model, e.g., "everything else" that is not described in the training model. As previously described, however, noticeable amounts of sound data that correspond to the training model 206 (e.g., noise) may still be left behind, especially in instances involving non-stationary noises. Accordingly, masking techniques may be employed to further improve the results, an example of which is further described as follows.

Figure 4:
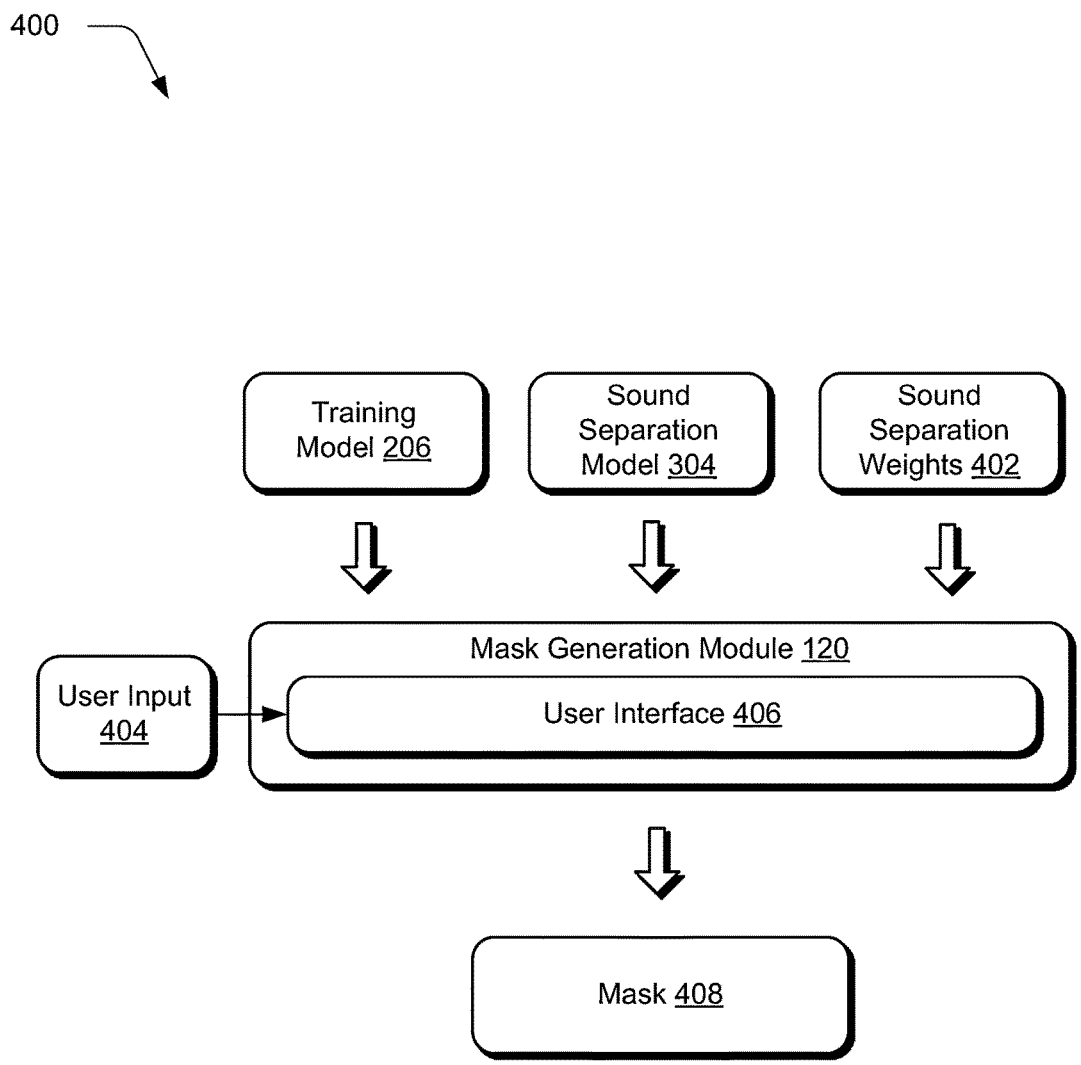
FIG. 4 depicts a system in an example implementation in which a mask is generated using the training model of FIG. 2, the sound separation model of FIG. 3, and a user input.

FIG. 4 depicts a system 400 in an example implementation in which a mask is generated using the training model 206, the sound separation model 304, weights 402 learned during generation of the sound separation model 304, and a user input 404. As before, the training and sound separation time/frequency representations 402, 404 includes weights and spectral components of each source respectively and are provided as inputs into the mask generation module 120.

The mask generation module 120 is illustrated as including a user interface 406. The user interface 406 is configured to include a mechanism via which a user input 404 may be utilized to specify one or more of a plurality of values to indicate a desired level of "aggressiveness" in computing the mask 408. The user interface, for instance, may include a slider control, a text entry box, configured to accept a gesture, voice input, and so on via which the user may specify a particular one of a plurality of amounts, e.g., levels.

The user input 404, along with the training model 206 and the sound separation model 304 may be used to generate the mask 408, which may then be used to decompose the sound data 108. Further discussion of thresholds and varying levels of aggressiveness may be found in relation to the following figure.

Figure 5:
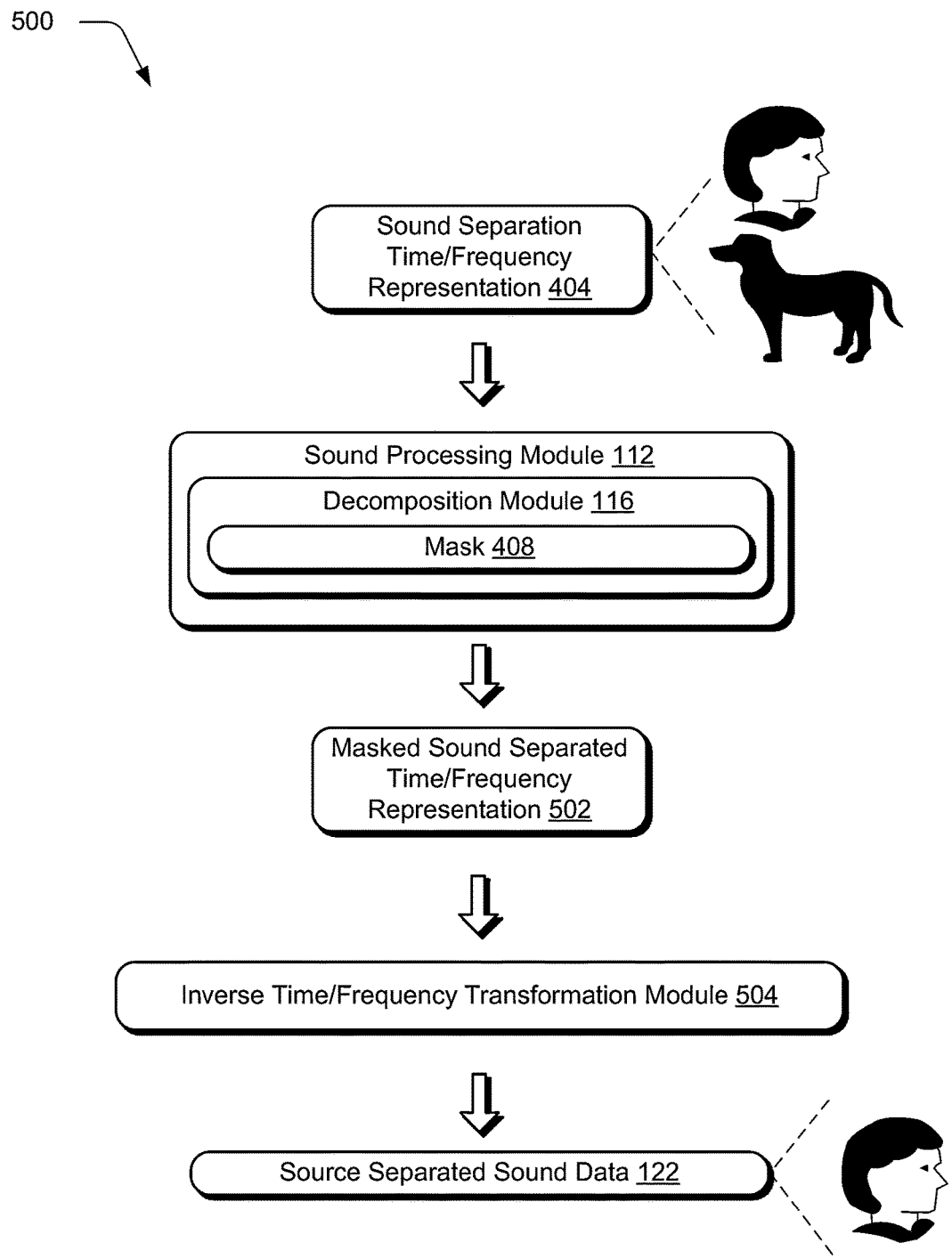
FIG. 5 depicts a system in an example implementation in which the mask of FIG. 4 is applied to the sound data to assign sound data to respective sources.

FIG. 5 depicts a system 500 in an example implementation in which the mask 408 of FIG. 4 is applied to the sound data to assign sound data to respective sources. In this example, the sound separation time/frequency representation 404 is received by the decomposition module 116 of the sound processing module 112. The decomposition module 116 then applies the mask 408 to the representation to further reduce the noise in this example be removing sounds of the barking dog from speech included in the sound data.

The mask 408, as previously described, may be configured to have variable levels of aggressiveness as specified by a user through the user input 408 of FIG. 4 through use of a threshold computed from the user input 408. This threshold may then be applied to the mask, and via the mask 408 to various portions of the sound data to assign all or parts of those portions to respective sources of the sound data.

Figure 6:
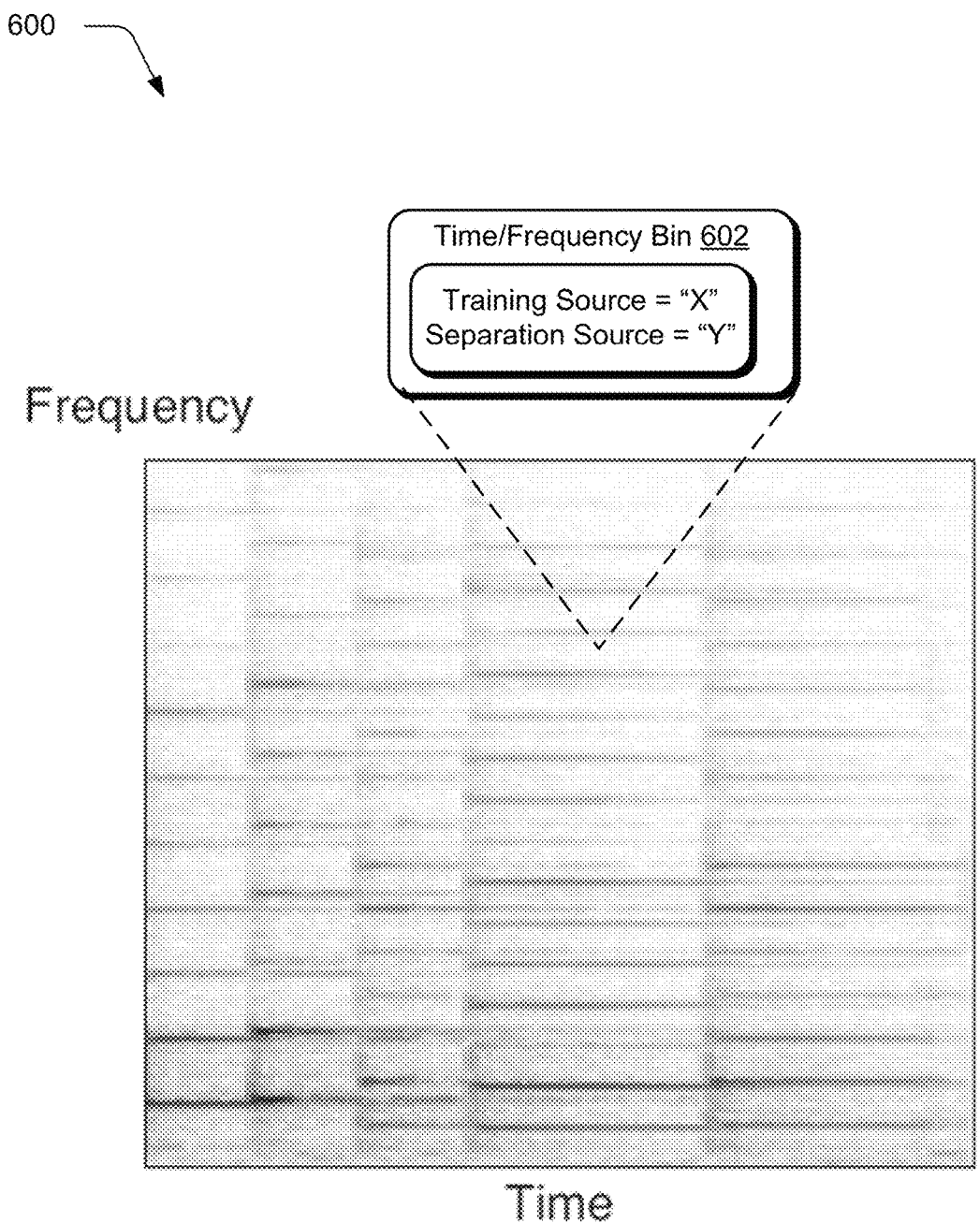
FIG. 6 depicts an example spectrogram that includes a plurality of time/frequency bins.

FIG. 6, for instance, depicts an example spectrogram 600 that includes a plurality of time/frequency bins 602. Each of the time/frequency bins 602 corresponds to a particular time/frequency combination in the spectrogram 600, e.g., time "X" and frequency "Y". Based on processing performed by the decomposition module 116, a relationship may be defined regarding an amount different sources contributed to the sound data in that time/frequency bin 602, e.g., Training Source="X" and Separation Source="Y" as illustrated. Accordingly, a threshold defined by the mask 412 may be used to further process this sound data.

The user input 408, for instance may be used to specify a level of aggressiveness that may be used as part of this assignment. For example, if an amount of sound data that is associated with a noise source for a time/frequency bin 602 exceeds an amount of sound data that is associated with a speech source for that bin, an entirety of the time/frequency bin 602 may be assigned to the noise source. In a more aggressive example, if the amount of sound data that is associated with the speech source is twice as much (i.e., twice as loud) as the sound data associated with the noise source, the time/frequency bin 602 is associated with the speech source. Therefore, in these examples the mask 408 has variable aggressiveness corresponding to how much louder does the speech have to be in relation to the noise for the speech to "get the energy" as further described in relation to the implementation example below. Thus, in these examples the mask 408 has a binary configuration, in that, the bin is assigned to either the noise source or the speech source.

Non-binary configurations (e.g., arbitrary configuration) of the mask 408 are also contemplated, such as to employ a ratio to define amounts of the sound data that are to be assigned to respective sources. In this way, the sound processing module 112 may process the sound separation time/frequency representation 404 to generate a masked sound separated time/frequency representation 502. This representation may then be processed by the inverse time/frequency transformation module 504 using the phase of the "noisy speech" of the sound data 108 to yield the source separated sound data 112 as a final denoised signal in the time domain. These techniques may be performed utilizing a variety of different functionality, an example of which is described in the following section.

Implementation Example

Figure 7:
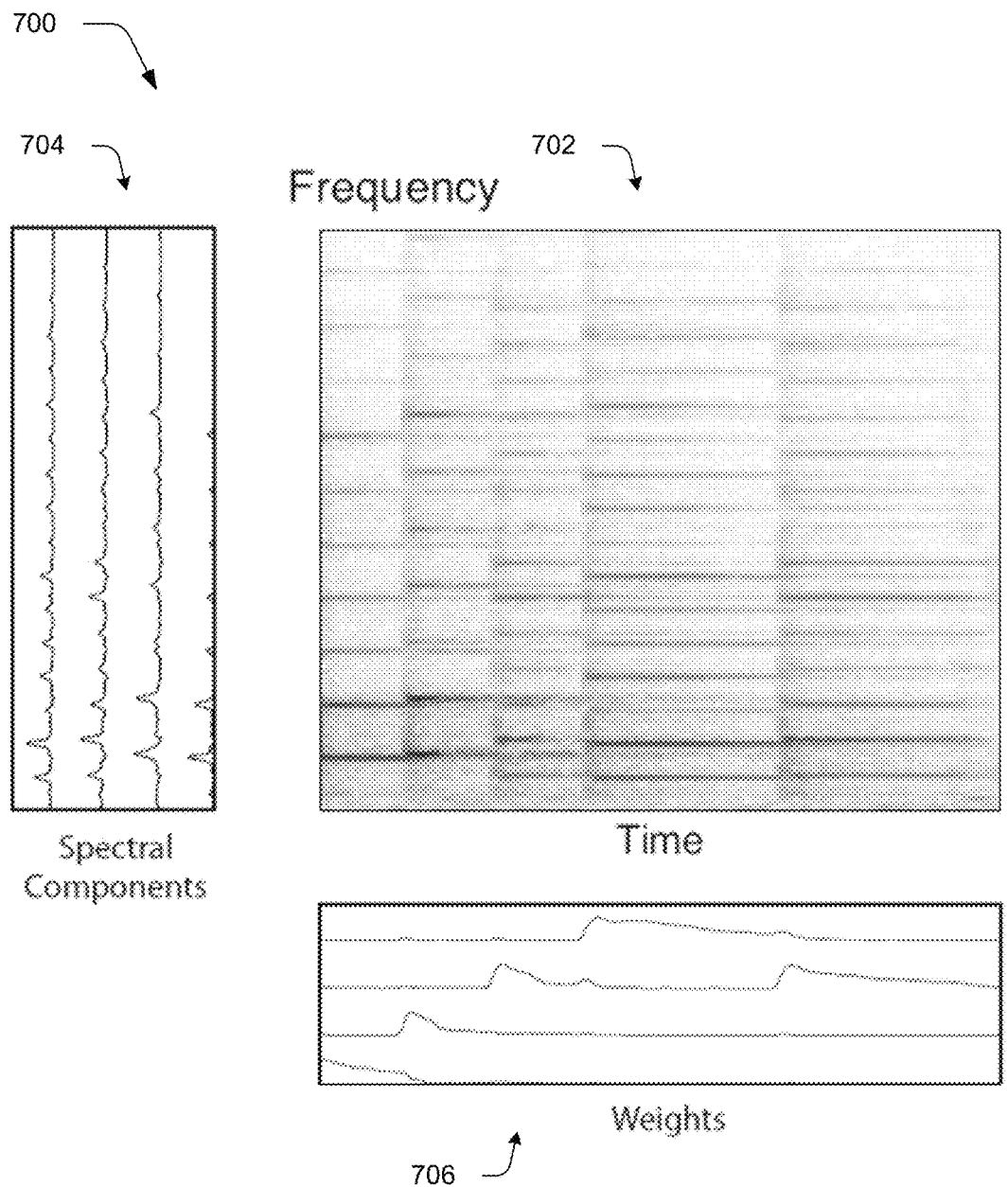
FIG. 7 depicts an example of a time/frequency representation of sound data that is usable to depict a structure of the sound data.

FIG. 7 depicts an example 700 of a time/frequency representation of sound data that is usable to depict a structure of the sound data. A variety of different techniques may be employed, including probabilistic latent component analysis. In the following, non-negative matrix factorization (NMF) is first described because PLCA is a probabilistic version of NMF.

Non-negative matrix factorization may be configured for use in sound processing because sound spectrograms (also referred to as simply spectrograms in the following discussion) are effectively low rank non-negative matrices. Therefore, these spectrograms may be used to compactly represent sound data 108 in a semantically meaningful way. A typical audio spectrogram may be described using a few spectral patterns and these spectral patterns may be interpreted as a basis or a dictionary of spectral components.

As shown in the example 700 of FIG. 7, for instance, non-negative matrix factorization may be applied to a spectrogram 702 of a sound clip of piano music. The sound clip has five notes as can be seen in the spectrogram 702. The fifth note is a repetition of the third note so there are four distinct notes. When NMF is applied to the spectrogram 702 (with K=4), four distinct spectral components 704 are learned. Additionally, the weights 706 of these spectral components at each time frame are learned. The attack and decay of each note can be seen in the weights. Additionally, the repetition of the third note can also be seen in the weights.

Each time frame of a spectrogram can thus be explained by a linear combination of these spectral components. A typical model is as follows:

$$v_t \approx \sum_{k=1}^{K} h_{kt} w_k,$$

where "$v_t$" is the "t-th" frame of the spectrogram. The spectrogram is explained by "K" spectral components. The component "$w_k$" is the "k-th" component and "$h_{kt}$" is the weight of the "k-th" component at time "t." In matrix notation, this relationship may be represented as:

$$V \approx WH,$$

where the spectrogram "V," is a "F×T" matrix. The dictionary "W" is a "F×K" matrix in which each column is a spectral component. The mixture weights may be expressed in a "K×T" matrix "H" in which each row represents the weights for a given component.

Given "V," the estimation of "W" and "H" with the constraint that both matrices are non-negative, expresses the non-negative matrix factorization (NMF) problem. This is useful for discovering structure in spectrograms as shown in the example 700 of FIG. 7.

Non-negativity plays a role in this factorization to discover spectral components that characterize the spectrogram. Since a spectrogram is by definition non-negative, semantically meaningful spectral components are also non-negative. Since the spectrogram is modeled as a weighted sum of spectral components, the estimated components may have negative values without an explicit non-negativity constraint. This may be observed in algorithms such as principle component analysis (PCA). Given a spectrogram, the model that is learned is therefore the dictionary of spectral components. This dictionary may be used for representing the general characteristics of the sound source and can be generalized to other unseen instances of the source. The weights, on the other hand, characterize the specific instance of data at hand.

Probabilistic Latent Component Analysis (PLCA) is a probabilistic version of non-negative matrix factorization. This family of models is generated by leveraging a realization that the given spectrogram is generated by a set of latent components. The latent components are the spectral components as seen in NMF. Given the spectrogram, these latent components may be estimated using an energy/magnitude technique.

A spectrogram is modeled as a histogram of "sound quanta." The amount of sound quanta in a given time/frequency bin (i.e., a particular portion of the time/frequency representation) indicates the Fourier magnitude of that bin and is given by "$V_{ft}$." A generative process is used to hypothesize the construction of the histogram. Once normalized, this represents a joint probability distribution "P(f; t)" over time and frequency.

Accordingly, "P(f; t)" may be modeled such that each time frame is modeled as a linear combination of spectral components. Therefore, each time frame may have a different distribution of weights. Since the weights for a given time frame form a distribution, this distribution may be interpreted as "mixture weights" and modeled according to the following expression:

$$P_t(f) = \sum_z P(f \mid z) P_t(z)$$

where "$P_t(f)$" corresponds to the normalized spectrogram at time frame "t." The term "p(f|z)" represents a spectral component and "$P_t(z)$" is a distribution of mixture weights at time frame "t." Each of the distributions are discrete.

Given the spectrogram, a set of weights may be estimated at each time frame with a single set of spectral components being estimated for the whole. This may be performed using the following energy/magnitude technique:

Energy Step:

$$P_t(z \mid f) = \frac{P_t(z) P(f \mid z)}{\sum_z P_t(z) P(f \mid z)}$$

Magnitude Step:

$$P(f \mid z) = \frac{\sum_t V_{ft} P_t(z \mid f)}{\sum_f \sum_t V_{ft} P_t(z \mid f)}$$

$$P_t(z) = \frac{\sum_f V_{ft} P_t(z \mid f)}{\sum_z \sum_f V_{ft} P_t(z \mid f)}$$

Therefore, to perform masking, let "$\tilde{V}_{ft}^{(s)}$" and "$\tilde{V}_{ft}^{(n)}$" represent the estimated separated speech and noise spectrograms before masking. Also, let "$V_{ft}^{(s)}$" and "$V_{ft}^{(n)}$" represent the estimated separated speech and noise spectrograms, respectively, after applying the masking. User-defined aggressive is defined using parameter "λ." The masking techniques may be performed as follows. For each time-frequency bin "f,t," a mask is computed as follows:

If $\tilde{V}_{ft}^{(s)} > \lambda \tilde{V}_{ft}^{(n)}$, then $\text{mask}_{ft}=1$, else $\text{mask}_{ft}=0$ The refined speech spectrogram $V_{ft}^{(s)}$ is then computed as follows:

$$V_{ft}^{(s)} = \text{mask}_{ft} \tilde{V}_{ft}^{(s)}$$

Accordingly the aggressiveness of the mask is proportional to "λ." If "λ" is equal to one, then it will be a standard binary mask. Increased aggressiveness may have a number of advantages, including suppression of unwanted sound to a greater degree. However, the disadvantages of being more aggressive include a chance that the sound of interest may be suppressed to some degree with a chance of introducing artifacts. Accordingly, the degree of aggressiveness may be balanced to achieve desired results.

Example Procedures

The following discussion describes masking techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-7.

Figure 8:
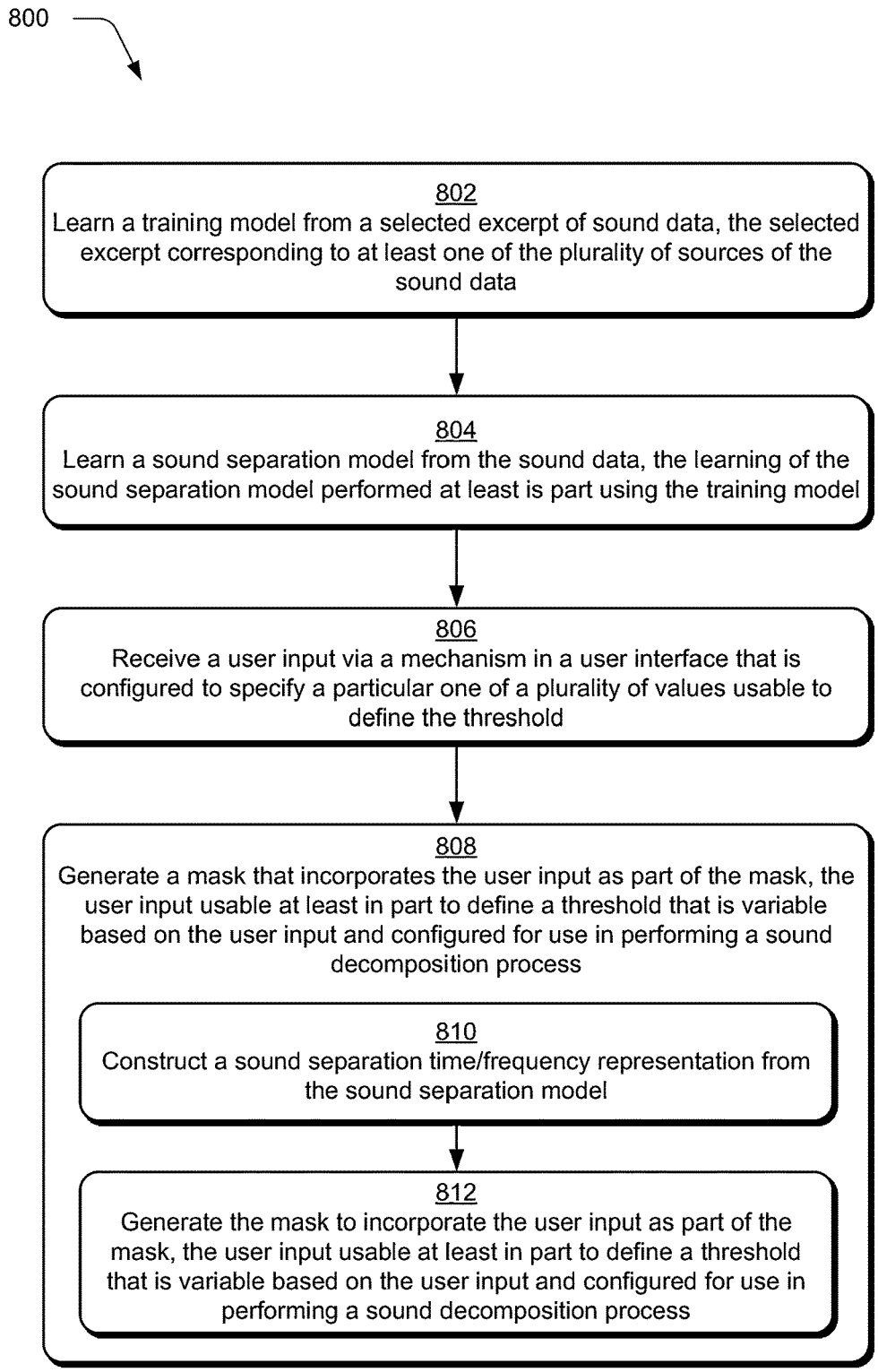
FIG. 8 is a flow diagram depicting a procedure in an example implementation in which a mask is generated for use as part of a sound decomposition process.

FIG. 8 depicts a procedure 800 in an example implementation in which a mask is generated for use as part of a sound decomposition process. A training model is learned from a selected excerpt of sound data, the selected excerpt corresponding to at least one of the plurality of sources of the sound data (block 802). For example, an excerpt of the sound data 108 may be selected that includes sound to be removed from the sound data 108, e.g., noise. This excerpt may serve as the training data. A short-time Fourier transform (STFT) of this excerpt may then be computed and the magnitude of the STFT (i.e., spectrogram) may be obtained. Spectral components (e.g., "P(f|z)") and weights (e.g., "$P_t$(z)") may then be obtained for the spectrogram using PLCA as described above. These learned spectral components form the model for noise in this example and the weights are no longer used.

A sound separation model is learned from the sound data, the learning of the sound separation model performed at least is part using the training model (block 804). Continuing with the previous example, a STFT is computed of the noisy speech of the sound data 108, or more generally sound data that corresponds to a source that is to be retained that is mixed with sound data that corresponds to a source that is to be removed. The magnitude of the STFT (i.e., spectrogram) is computed and PLCA is applied to this spectrogram.

This time, however, the spectral components that correspond to the noise are kept fixed and the spectral components are estimated that correspond to speech. For example, if twenty spectral components are used to model noise and forty spectral components to model speech, the latter forty components are estimated, solely. The energy step and weights are estimated for each of the components.

A user input is received via a mechanism in a user interface that is configured to specify a particular one of a plurality of values usable to define the threshold (block 806). The computing device 102, for instance, may output a mechanism such as a text entry box, slider control, and so on via which a user may interact with a keyboard, cursor control device, gesture, voice input, and so on. The user may then specify a particular one of a plurality of values that may be used to define an amount of "aggressiveness" that is to be used in generating the mask as described above.

A mask is then generated that incorporates the user input as part of the mask, the user input usable at least in part to define a threshold that is variable based on the user input and configured for use in performing a sound decomposition process (block 808). For example, a sound separation time/frequency representation is constructed from the sound separation model (block 810). A speech spectrogram "$\tilde{V}_{ft}^{(s)}$" for instance, may be constructed from the spectral components and weights learned above. A noise spectrogram "$\tilde{V}_{ft}^{(n)}$" may also be constructed from the spectral components and weights. A spectrogram used to construct the training model may also be used.

The mask is then generated that incorporates the user input as part of the mask, the user input usable at least in part to define a threshold that is variable based on the user input and configured for use in performing a sound decomposition process (block 812). The generation of the mask may then be performed at least in part using the sound separation time/frequency representation, a timing time/frequency representation corresponding to the training model, and the user input. For example, a mask represented as "$\text{mask}_{ft}$" may be computed using the spectrograms "$\tilde{V}_{ft}^{(s)}$" and "$\tilde{V}_{ft}^{(s)}$" the aggressiveness threshold "λ" computed from the user input.

Figure 9:
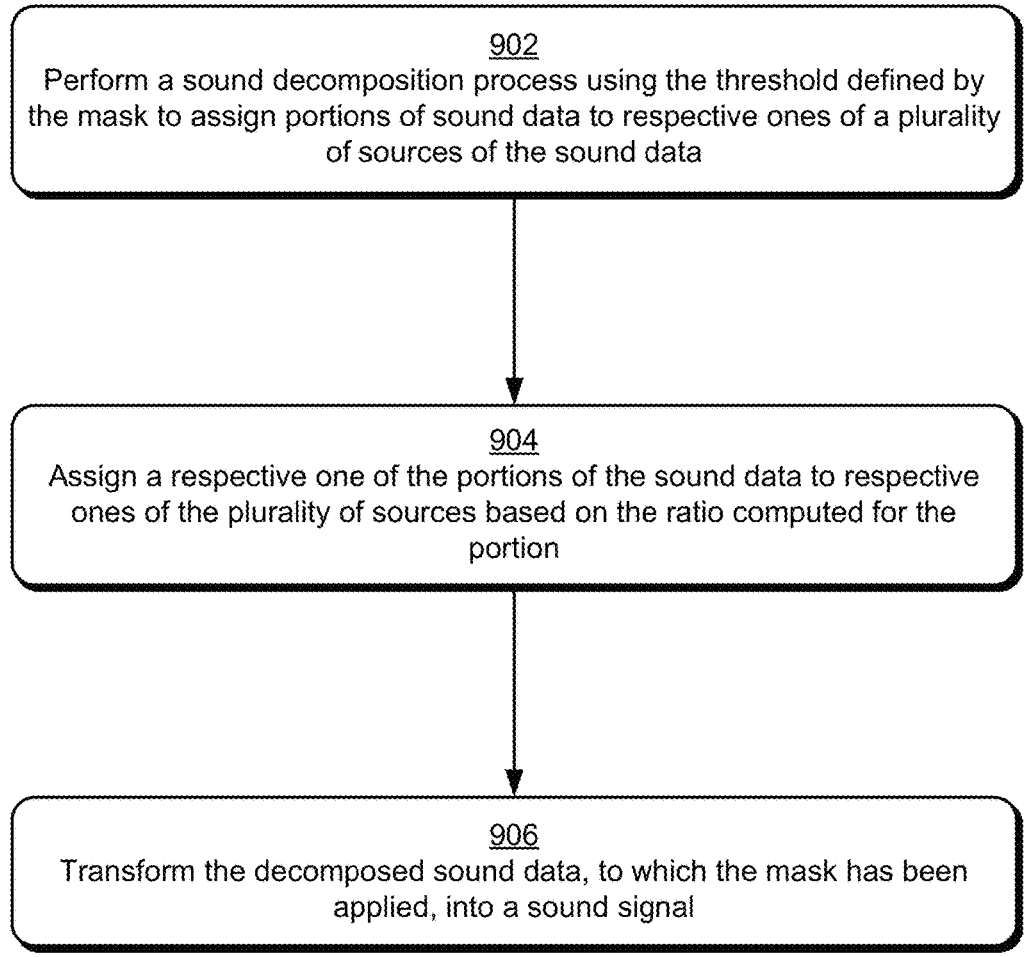
FIG. 9 is a flow diagram depicting a procedure in an example implementation in which the mask of FIG. 8 is used as part of the sound decomposition process.

FIG. 9 depicts a procedure 900 in an example implementation in which the mask generated is FIG. 8 is applied as part of a sound decomposition process. Continuing with the previous example, a sound decomposition process is performed using the threshold defined by the mask to assign portions of sound data to respective ones of a plurality of sources of the sound data (block 902). For example, the mask may be applied to the speech spectrogram to obtain the refined speech spectrogram "$V_{ft}^{(s)}$". This may be performed to assign a respective one of the portions of the sound data to respective ones of the plurality of sources based on the ratio computed for the portion (block 904). The assignment, for instance, may be performed for an entirety of the portion to a single respective one of the plurality of sources based on the ratio computed for the portion using the threshold.

The decomposed sound data, to which the mask has been applied, may then be transformed into a sound signal (block 906). This may include taking an inverse STFT using the spectrogram "$V_{ft}^{(s)}$" and the phase of the "noisy" speech to yield a final de-noised signal in the time domain. A variety of other examples are also contemplated without departing from the spirit and scope thereof.

Example System and Device

Figure 10:
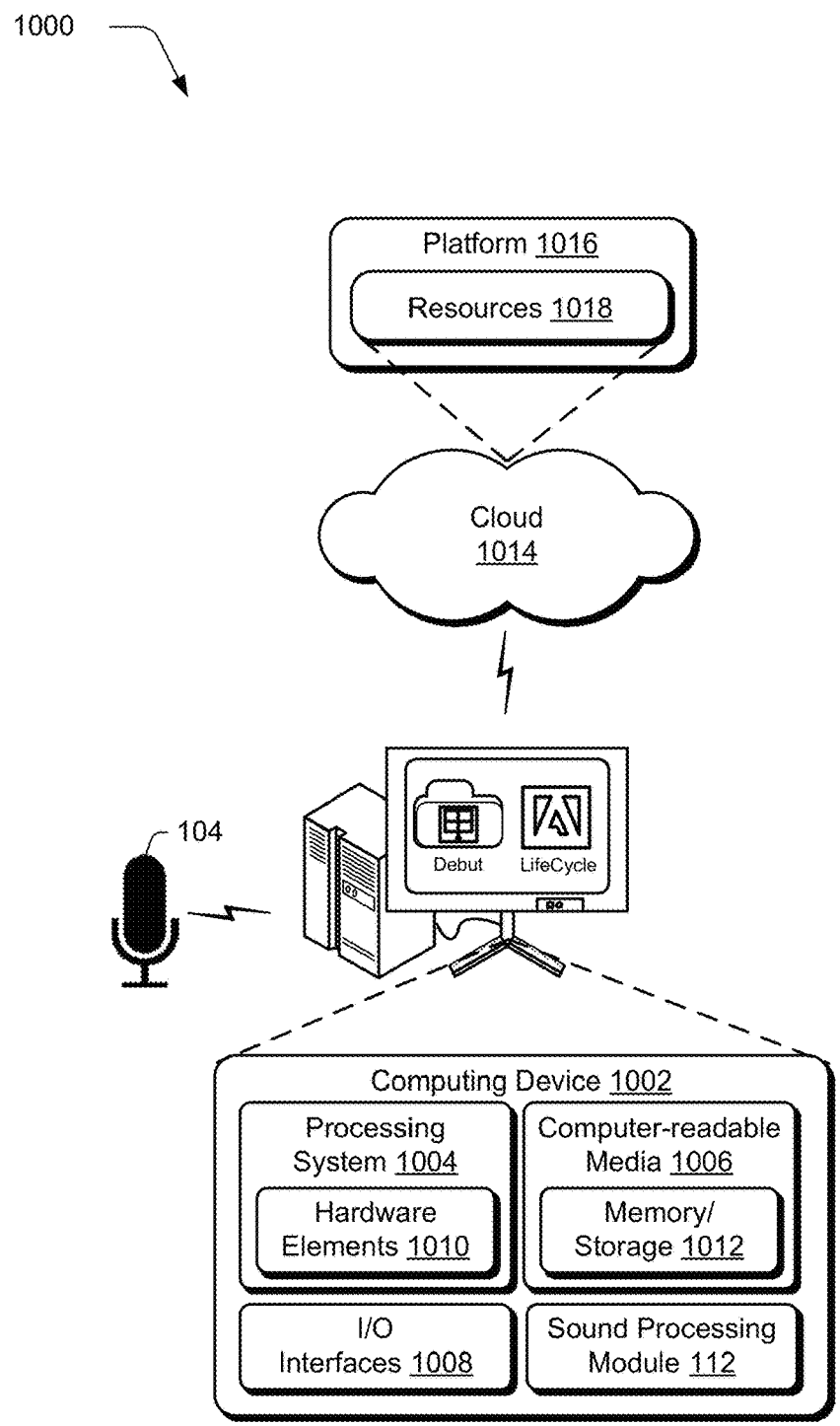
FIG. 10 illustrates an example system including various components of an example device that can be implemented as any type of computing device as described and/or utilize with reference to FIGS. 1-9 to implement embodiments of the techniques described herein.

FIG. 10 illustrates an example system generally at 1000 that includes an example computing device 1002 that is representative of one or more computing systems and/or devices that may implement the various techniques described herein. This is illustrated through inclusion of the sound processing module 112, which may be configured to process sound data. The computing device 1002 may be, for example, a server of a service provider, a device associated with a client (e.g., a client device), an on-chip system, and/or any other suitable computing device or computing system.

The example computing device 1002 as illustrated includes a processing system 1004, one or more computer-readable media 1006, and one or more I/O interface 1008 that are communicatively coupled, one to another. Although not shown, the computing device 1002 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware element 1010 that may be configured as processors, functional blocks, and so forth. This may include implementation in hardware as an application specific integrated circuit or other logic device formed using one or more semiconductors. The hardware elements 1010 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1006 is illustrated as including memory/storage 1012. The memory/storage 1012 represents memory/storage capacity associated with one or more computer-readable media. The memory/storage component 1012 may include volatile media (such as random access memory (RAM)) and/or nonvolatile media (such as read only memory (ROM), Flash memory, optical disks, magnetic disks, and so forth). The memory/storage component 1012 may include fixed media (e.g., RAM, ROM, a fixed hard drive, and so on) as well as removable media (e.g., Flash memory, a removable hard drive, an optical disc, and so forth). The computer-readable media 1006 may be configured in a variety of other ways as further described below.

Input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1002 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1002. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1002, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1010 and computer-readable media 1006 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1010. The computing device 1002 may be configured to implement particular instructions and/or functions corresponding to the software and/or hardware modules. Accordingly, implementation of a module that is executable by the computing device 1002 as software may be achieved at least partially in hardware, e.g., through use of computer-readable storage media and/or hardware elements 1010 of the processing system 1004. The instructions and/or functions may be executable/operable by one or more articles of manufacture (for example, one or more computing devices 1002 and/or processing systems 1004) to implement techniques, modules, and examples described herein.

The techniques described herein may be supported by various configurations of the computing device 1002 and are not limited to the specific examples of the techniques described herein. This functionality may also be implemented all or in part through use of a distributed system, such as over a "cloud" 1014 via a platform 1016 as described below.

The cloud 1014 includes and/or is representative of a platform 1016 for resources 1018. The platform 1016 abstracts underlying functionality of hardware (e.g., servers) and software resources of the cloud 1014. The resources 1018 may include applications and/or data that can be utilized while computer processing is executed on servers that are remote from the computing device 1002. Resources 1018 can also include services provided over the Internet and/or through a subscriber network, such as a cellular or Wi-Fi network.

The platform 1016 may abstract resources and functions to connect the computing device 1002 with other computing devices. The platform 1016 may also serve to abstract scaling of resources to provide a corresponding level of scale to encountered demand for the resources 1018 that are implemented via the platform 1016. Accordingly, in an interconnected device embodiment, implementation of functionality described herein may be distributed throughout the system 1000. For example, the functionality may be implemented in part on the computing device 1002 as well as via the platform 1016 that abstracts the functionality of the cloud 1014.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by at least one computing device, the method comprising:
    generating, by the at least one computing device, a first spectrogram by processing sound data to learn spectral components and weights for a first portion of the sound data describing sound from a first source;
    generating, by the at least one computing device, a second spectrogram by processing the sound data to learn spectral components and weights for a second portion of the sound data describing sound from a second source;
    receiving a user input to define a threshold that is variable based on the user input and configured for use in performing a sound decomposition process, the threshold defining a relationship between the first and second sources;
    generating, by the at least one computing device, a mask usable to assign particular time/frequency bins of a plurality of time/frequency bins of the sound data to respective sources, each particular time/frequency bin corresponding to a respective time/frequency combination within the sound data, a content of the mask determined for each particular time/frequency bin based on the defined relationship as applied to the respective spectral components and weights of the first and second spectrograms at the respective time/frequency bin; and
    performing, by the at least one computing device, the sound decomposition process on the first spectrogram by using the mask to assign each of the time/frequency bins of the first spectrogram to a respective one of the first source or the second source.

2. A method as described in claim 1, further comprising learning a training model from a selected excerpt of the sound data, the selected excerpt corresponding to at least one of the first and second sources of the sound data and wherein the mask is generated at least in part using the training model.

3. A method as described in claim 2, further comprising learning a sound separation model from the sound data, the learning of the sound separation model performed at least is part using the training model.

4. A method as described in claim 3, further comprising constructing a sound separation time/frequency representation from the sound separation model and wherein the generating of the mask is performed at least in part using the sound separation time/frequency representation, a time/frequency representation corresponding to the training model, and the user input.

5. A method as described in claim 3, wherein the learning of the training model or the sound separation model is performed using non-negative matrix factorization (NMF) or probabilistic latent component analysis (PLCA).

6. A method as described in claim 1, wherein the threshold is described as a ratio involving the first source and the second source.

7. A method as described in claim 6, wherein the performing of the sound decomposition process using the threshold includes assigning a respective one of the time/frequency bins of the sound data to a respective one of the first and second sources based on the ratio computed for the respective time/frequency bin.

8. A method as described in claim 1, wherein the first source includes speech and the second source includes noise.

9. A method as described in claim 1, further comprising receiving the user input via a mechanism in a user interface that is configured to specify a particular one of a plurality of values usable to define the threshold.

10. A method as described in claim 1, wherein the performing includes assigning a first time/frequency bin corresponding to a time and a first frequency to a respective one of the first or second sources, and assigning a second time/frequency bin corresponding to the time and a second frequency to a respective one of the first or second sources.

11. A method as described in claim 1, wherein the first spectrogram is generated based on portions of the sound data associated with speech, the second spectrogram is generated based on portions of the sound data associated with noise, and wherein the performing the sound decomposition process on the first spectrogram includes assigning a respective one of the time/frequency bins of the first spectrogram as corresponding to the speech.

12. A system comprising:
    at least one module implemented at least partially in hardware, the at least one module configured to perform operations comprising:

generating a first spectrogram by processing sound data to learn spectral components and weights for a first portion of the sound data describing sound from a first source;

generating a second spectrogram by processing the sound data to learn spectral components and weights for a second portion of the sound data describing sound from a second source;

receiving an input via a user interface to define a threshold that is variable based on the user input, the threshold defining a relationship between the first and second sources;

generating a mask usable to assign particular time/frequency bins of a plurality of time/frequency bins of the sound data to respective sources, each particular time/frequency bin corresponding to a respective time/frequency combination within the sound data, a content of the mask determined for each particular time/frequency bin based on the defined relationship as applied to the respective spectral components and weights of the first and second spectrograms at the respective time/frequency bin; and performing a sound decomposition process on the first spectrogram by using the mask to assign each of the time/frequency bins of the first spectrogram to a respective one of the first source or the second source.

13. A system as described in claim 12, wherein the at least one module is configured to perform the assigning by assigning respective ones of the time/frequency bins of the sound data to a respective one of the first and second sources based on a ratio computed for the respective time/frequency bin.

14. A system as described in claim 13, wherein the assigning is performed for an entirety of at least one time/frequency bin to a single respective one of the first and second sources based on the ratio computed for the at least one time/frequency bin using the threshold.

15. A system as described in claim 12, wherein the at least one module is configured to output the user interface to include a mechanism that is configured to support interaction to specify a particular one of a plurality of values usable to define the threshold.

16. A system as described in claim 12, wherein the assigning includes assigning a first time/frequency bin corresponding to a time and a first frequency to a respective one of the first or second sources, and assigning a second time/frequency bin corresponding to the time and a second frequency to a respective one of the first or second sources.

17. A system as described in claim 12, wherein the first spectrogram is generated based on portions of the sound data associated with speech, the second spectrogram is generated based on portions of the sound data associated with noise, and wherein the performing the sound decomposition process on the first spectrogram includes assigning a respective one of the time/frequency bins of the first spectrogram as corresponding to the speech.

18. At least one non-transitory computer readable storage media comprising instructions stored thereon that, responsive to execution by a computing device, causes the computing device to perform operations comprising:

generating a first spectrogram by processing sound data to learn spectral components and weights for a first portion of the sound data describing sound from a first source;

generating a second spectrogram by processing the sound data to learn spectral components and weights for a second portion of the sound data describing sound from a second source;

receiving a user input to define a threshold that is variable based on the user input, the threshold defining a relationship between the first and second sources of the sound data;

generating a mask usable to assign particular time/frequency bins of a plurality of time/frequency bins of the sound data to respective sources, each particular time/frequency bin corresponding to a respective time/frequency combination within the sound data, a content of the mask determined for each particular time/frequency bin based on the defined relationship as applied to the respective spectral components and weights of the first and second spectrograms at the respective time/frequency bin; and performing a sound decomposition process on the first spectrogram by using the mask to assign each of the time/frequency bins of the first spectrogram to a respective one of the first source or the second source.

19. At least one non-transitory computer readable storage media as described in claim 18, wherein the first source includes speech and the second source includes noise, and wherein the excerpt of the sound data includes data corresponding to the noise.

20. At least one non-transitory computer readable storage media as described in claim 18, wherein the user input is received via a mechanism in a user interface that is configured to specify a particular one of a plurality of values usable to define the threshold.

* * * * *